United States Patent [19]

Moser

[11] 4,087,224
[45] May 2, 1978

[54] INTEGRAL SKIN CUSHION MOLDING APPARATUS

[75] Inventor: Kurt Moser, Kirchheim, Germany

[73] Assignee: The Upjohn Company, Kalamazoo, Mich.

[21] Appl. No.: 726,765

[22] Filed: Sep. 27, 1976

[30] Foreign Application Priority Data

Sep. 24, 1976 Germany .............................. 2542588

[51] Int. Cl.² ............................................. B29C 17/04
[52] U.S. Cl. ..................................... 425/388; 425/89;
425/DIG. 44; 425/DIG. 60; 264/89; 264/90
[58] Field of Search ......... 435/89, 388, 405, DIG. 44,
435/DIG. 60; 264/89, 90, 92, 93

[56] References Cited

U.S. PATENT DOCUMENTS

| 3,027,596 | 4/1962 | Knowles | 425/388 X |
| 3,179,726 | 4/1965 | Perry | 425/89 |
| 3,231,647 | 1/1966 | Oesterheld | 425/388 X |
| 3,290,418 | 12/1966 | Best | 425/DIG. 44 |
| 3,336,424 | 8/1967 | Cheney | 425/388 X |
| 3,546,740 | 12/1970 | Johnson | 425/89 |

*Primary Examiner*—Robert L. Spicer, Jr.
*Attorney, Agent, or Firm*—St. Onge, Mayers, Steward & Reens

[57] ABSTRACT

A method and an apparatus are disclosed for vacuum or gauge pressure shaping of extensible sheet material in a mold, more particularly pre-shaping of a textile or plastic sheet or film used as an integral skin for a foam cushion, to effect uniform stretch of the sheet throughout its area notwithstanding substantial depth variation in surface contour of the final shaped sheet material.

3 Claims, 4 Drawing Figures

INTEGRAL SKIN CUSHION MOLDING APPARATUS

BACKGROUND OF THE INVENTION

1. Field of the Invention

The invention relates to a method for vacuum or gauge pressure shaping in a mold of a foil, sheet or film, more particularly of a textile, plastic or textile-like material which can be deformed in cold or heated condition, more particularly in the production of cushions of soft foamed plastic having an integrated skin or cover of sheet material; and to apparatus suitable for carrying out the method.

2. Description of the Prior Art

The production of cushions of elastic foamed plastic having a composite surfacing structure of fabric or the like has previously been proposed, wherein a sheet or film of textile-like material, which can be deformed when cold or in heated condition and made impermeable to air by an elastic coating of one of its surfaces, is laid across the open face of a suitable configured cavity in a molding die, following which the sheet material is stretched while being brought into snug conformance under the action of vacuum (or pressure) with the wall of the molding die. A foamable plastic mixture is then poured into the mold cavity, while lined with the sheet member, and this mixture foams in the cavity and forms the body of a cushion. After polymerisation of the foam material, the suitably configured body of foam with the surfacing permanently attached to the foam material, is removed from the mold cavity.

A substantial difficulty in the case of this known method lies in the achievement of a uniform thickness and extension of the fabric surfacing structure of the finished product. It is to be conceded that on establishing the vacuum in the mold cavity, the whole fabric is more or less evenly stretched as it initially comes into contact with the shallower parts of the mold cavity in the molding die. Those areas of the fabric which contact the wall are then fixed, however, against further stretching by the combined action of the vacuum and the friction against the mold wall.

Where there is substantial depth variation in the mold contour, those areas of the fabric which do not initially contact the mold wall must undergo additional stretching to bring them into contact with the deeper part of the mold cavity. This leads as a result to different degrees of stretch or extension of the fabric in different areas on the surface of the cushion, and therefore to locally different thicknesses of the fabric surfacing structure on the finished cushion. In other words, the frictional forces effective at the initially contacted surface impair even extension or stretch during the final stage of shaping to conform to the deeper areas of the mold cavity. This eventually means that in the case of the finished product (e.g. a cushion) it is the very areas of the cover which are subject to the heaviest loading that are thinnest.

In order to obtain more uniformity of the thickness of the fabric all across the surfacing structure, it becomes necessary to effect a sliding movement of the fabric on the cavity wall of the molding die after initial contact is made. This however will not occur for the above mentioned reasons, and it has been the practice heretofore to apply lubrication of some form to make possible such a sliding movement of the fabric. However this is not very practical because it causes fouling of the cover of the finished cushion. Furthermore clogging of the vacuum exhaust holes in the mold wall presents a definite manufacturing disadvantage.

In order to be able to deal with, or at least to reduce the above mentioned difficulties, it has also been suggested heretofore to use a mold plunger, or a number of such plungers, to mechanically press the fabric into the deeper areas of the cavity of the molding die before the vacuum becomes established in the mold cavity. By the use of such mold plungers the fabric is subjected as a whole to a first, more or less, even deformation to give it a preliminary shape more nearly approaching that of the mold cavity, before the vacuum becomes established; thereafter the fabric is brought into final complete conformity to the die by undergoing an additional deformation of substantially lower order, as effected by application of vacuum at such time.

This manner of operation, which makes possible a shaping in the mold of the fabric under tension which, all-in-all, is relatively even, however requires additional mold devices which are complicated and expensive, especially where the cavity wall of the molding die is vaulted and has shapes which are difficult to produce. Furthermore such additional devices are not practical in the case of molding dies which are continuously advanced, as in a production line involving automated manufacture of the cushions.

There has also been a previous proposal (see German patent application No. P 25,11,811.0) to arrange an elastically deforming perforated membrane of varying thickness (possibly employing supplementally a liquid or solid lubricant) between the fabric and the mold wall. Owing to the variation in thickness, this membrane has a corresponding variation in stretch capacity, the localized membrane thickness being so selected that areas of greater thickness coincide with regions of deeper contouring in the mold cavity. The net effect of this is a relatively even stretch or extension of the fabric, since the fabric facing sheet frictionally adheres to the membrane surface and its stretch is accordingly controlled by the stretching action of the membrane.

SUMMARY OF THE INVENTION

A principal objective of the present invention is to obtain increased capability for stretching a fabric or plastic film in pre-shaping it for use as a cover member, and particularly to adapt it to even greater contour variations than heretofore practical. It is a further objective to do this without resorting to supplemental plunger apparatus and/or mold lubricants, thereby avoiding the above-mentioned attendant problems they introduce, and all without sacrificing the criterion of maintaining substantial uniform stretch or tension throughout the fabric or film cover. This objective is achieved by producing an air or gas film, during the shaping in the mold, between the mold cavity wall and the film (or fabric) cover, or between that cover and a perforated elastic membrane having localized thickness variations, if such a membrane is employed.

In accordance with the invention, the fabric or the membrane is made to slide on an air cushion created adjacent the molding cavity surface so that friction at the surface of the die cavity is reduced sufficiently to allow lateral slipping of the fabric (or the elastic membrane if one is employed) as the forming or shaping operation takes place. Thus in accordance with the invention, a completely uniform stretch of the fabric is obtained in a very simple manner.

For carrying out the method in accordance with the invention, an apparatus is provided which is characterized in that a mold box, delimited on one side by a suitably contoured mold wall provided with apertures, is subdivided into at least two chambers between which gas or air pressure differential is maintained up to the end or shortly before the end of the shaping operation in the mold. By virtue of the pressure differential, a film of gas or air is produced at the interface of the mold wall and the fabric (or membrane, if used), which substantially eliminates friction at such interface, such flow taking place from the chamber with a higher pressure into the one with a lower pressure via the apertures in the mold wall. As will readily be seen danger of fouling of the fabric or clogging of the passages is thus avoided. In cases where substantial depth variation in surface contour of the formed fabric or sheet material is involved, it will generally be advantageous to also employ a perforated elastic membrane of locally varied thickness across its area. This membrane, under the action of the mold pressure, first brings into engagement the thinner zones of the membrane (and the overlying fabric or other sheet material) with the shallower parts of the mold wall (i.e. the molding cavity surface) of the molding die. Subsequently the thicker parts of the membrane are deformed and come into engagement with the deeper parts of the mold wall. Such an arrangement leads to further improvement in obtaining uniform fabric stretch. The thinner parts of the membrane, which deform more easily and thus are deformed earlier, are the first to come into engagement with the shallower parts of the mold die, and thus transmit a certain stretch to the fabric, sheet plastic, etc. through its frictional engagement with the surface of the membrane. Only after these thin parts of the elastic membrane are brought into contact with the mold wall by the action of the vacuum will the thicker parts of the membrane begin to be materially deformed. This latter action, in turn, controls the degree of stretch imparted to the corresponding parts of the fabric as snug engagement with the deeper parts of the mold wall takes place.

By employing a membrane with suitable variation in thickness corresponding with the variation in depth of the mold wall as an adjuvant in the invention method, it is possible to ensure that the membrane will have generally the same degree of stretch or extension everywhere so that the fabric or film which is fixed against the membrane, and accordingly is deformed together with the latter, undergoes uniform extension as well.

In order to assist in fixing or locking the fabric or film against sliding on the membrane surface under the action of the vacuum produced in the mold cavity, it is advantageous to provide a layer of material such as polyisobutylene on the membrane.

The elastic membrane can be held in a separate clamping frame, together with the fabric, and the clamping frame then sealed to the peripheral edge of the molding die during the forming operation.

However the membrane can also be fixed directly to the periphery of the molding die cavity, and in such arrangement owing to the elasticity of the membrane gives the advantage of facilitating the removal of the molded cushion from the die at the end of the production cycle. In this arrangement, the fabric sheet to be shaped is placed and fixed in position separately above the membrane in a clamping frame and the frame is sealed at the peripheral edge of the molding die.

The elastic membrane can be of any suitable material which is sufficiently elastic to come into snug engagement with the contour of the mold cavity as vacuum is applied. It can, for example, be made of an elastic textile material, or of natural or synthetic rubber material. It is preferred to use a natural or synthetic rubber element with a suitably profiled surface, which offers certain advantages since a number of identical membranes of this type can be made from the same membrane mold, and these can be used for equipping a series of molding dies in a factory producing the cushions. Furthermore by casting or pressing the selected elastomeric material in such membrane mold, the manufacture of membranes with any desired changes in thickness is facilitated.

In the production of cushions of comparatively simple shape (i.e., low contour variation), it may be sufficient to form the fabric serving as the surface structure of such cushions in the mold without the use of a membrane, in which case the fabric still undergoes even stretching since the air or gas film produced at the interface in the mold during the shaping operation will permit sliding to occur at the interface and thus promote even distribution over the mold cavity surface.

Where the shaping of textile materials or films requires heat for deformation, the membrane employed in the molds must naturally consist of a material which withstands the temperatures occurring on deformation of the textile or other sheet material used as the covering surface on the cushions.

Further details of the invention will be gathered from the following description of two embodiments illustrated in the accompanying drawings.

The invention will first be described with reference to the embodiment shown in FIGS. 1 to 3 which are illustrative of the use of an elastic membrane.

Figure 1:
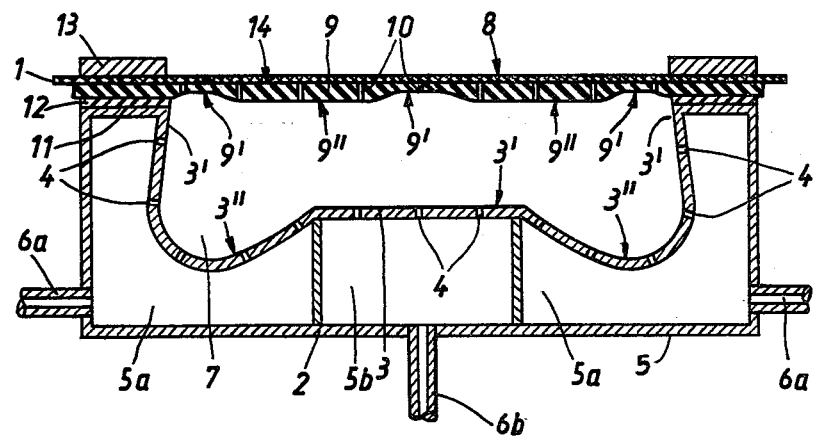
FIGS. 1 to 3 are simplified cross-sectional views of a vacuum mold illustrating diagrammatically various steps comprising the method of the invention in shaping a piece of fabric, film, etc. to form a skin or cover for a foam cushion, making use of an apparatus employing an elastic membrane with varied thickness.

In FIG. 1, an apparatus is shown for vacuum shaping of a fabric 1 in a mold, which fabric is to serve as the facing structure or cover of a cushion composed of elastic formed plastic. As shown in the drawing, the shaped fabric cover also serves as a mold liner during casting of a self-foaming polymeric mix deposited in the mold to form the body of the cushion. In the casting process the fabric cover becomes integrally attached to the developed foam.

The apparatus comprises a molding die 2, constructed as a mold box 5 defining a mold cavity 7 having a delineating mold wall 3 provided with apertures 4. Vacuum produced in the mold box 5 can thus become established through these apertures to the mold cavity 7 of the molding die. The space between the mold wall 3 and mold box 5 is subdivided into two chambers 5a, and a further central chamber 5b. Different gas or air pressures are maintained in these two sets of chambers during the shaping of the fabric in the mold. Depending on which chamber has the greater pressure, air or gas flows from chamber 5b to the two chambers 5a, or vice versa, and produces a cushioning gas film adjacent the molding cavity surface as the fabric approaches contact with that surface. In order to produce the differential vacuum pressure in the mold box 5, the latter has connections 6a and 6b for connecting the respective chambers 5a and 5b with a vacuum pump which draws air out of the mold box 5 and through the mold wall 3 from the mold cavity 7.

Fabric 1, which is to be shaped or formed in the molding die 2, is made impermeable to air by an elastic coating 8 applied to one of its surfaces. The coated fabric sheet is mounted together with an elastic membrane 9, provided with holes 10, across the open face of the cavity of the molding die 2, and is suitably fixed to the periphery 11 thereof. For this purpose the membrane and fabric are arranged with the latter on top and the die is provided with a peripheral seal 12. Preferably the membrane and fabric are fixed by means of an integral clamping frame 13 which cooperates with seal 12 to form an airtight fit on edge 11.

Membrane 9, on its side adjacent the fabric, is treated to provide a layer 14 of polyisobutylene or similar elastomeric material which will impart non-skid properties to the membrane such that when the fabric is held against the membrane 9 under the influence of the vacuum, it cannot be displaced laterally with respect to the membrane.

The membrane 9 is of varied thickness, being less in areas 9', which are designed to come into engagement with the shallower areas 3' of the mold wall 3, than the thickness in areas 9" which come into engagement with the deeper areas 3" of the mold wall 3.

Figure 2:
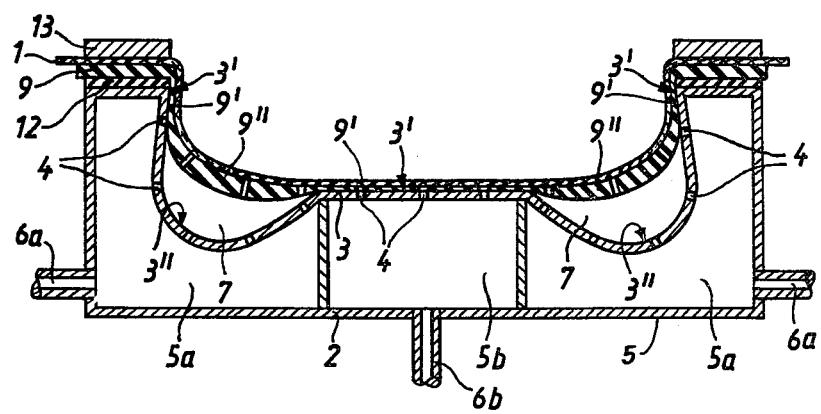

The thin regions 9' of the membrane 9 are deformed more readily than the thick zones 9" under the influence of the vacuum in the mold cavity 7 and thus are the first to come into contact with the mold wall, as seen in FIG. 2. In the illustrated embodiment shown in the drawing, the center and peripheral zones of the membrane 9 are first stretched or extended so that they come into engagement with the corresponding shallower areas 3' of the mold wall 3, while the thick zones 9" of the membrane remain substantially unchanged in this first stage. Since fabric 1 is fixed against the membrane 9, it follows the deformation of the membrane and accordingly is stretched in all zones which correspond to zones 9'.

When the thin zones 9' of the membrane 9 have come into engagement with the mold wall 3, the above mentioned gas or air film practically completely eliminates the friction between membrane 9 and mold wall 3 adjacent to chamber 5b, so that the membrane 9 can move substantially freely and uniformly in this area. Concomitantly, the thick zones 9" of the membrane begin to deform, as indicated in FIG. 3, and continues until the deeper zones 3" of the mold wall 3 are engaged through stretching in zones 9" of the membrane 9, something which leads to a corresponding extension of the fabric 1 in the corresponding areas.

Owing to the substantially complete elimination of friction between the membrane and mold wall by provision of the gas or air film, and owing to a suitable thickness distribution of the membrane, it is possible to ensure, even in the case of substantial depth variation in surface contour, the subjection of the membrane 9 to uniform deformation, even though it undergoes deformation in two stages affecting different parts of the membrane. Fabric 1 which, under the joint action of the vacuum and the surface friction effected by the anti-slip layer 14 of the membrane, is locked against the membrane, therefore precisely follows the deformation of the latter and consequently also undergoes substantially even deformation as a whole, with the result that by the time it is fully shaped, i.e., is in engagement with the mold wall 3, it has the same thickness throughout its surface.

Figure 3:
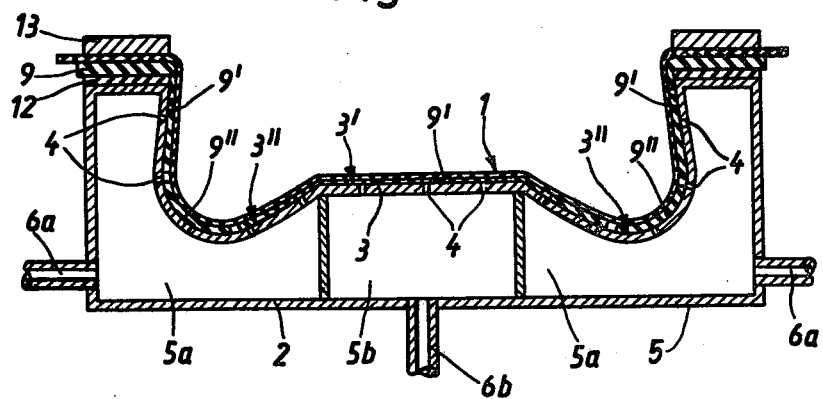
Figure 4:
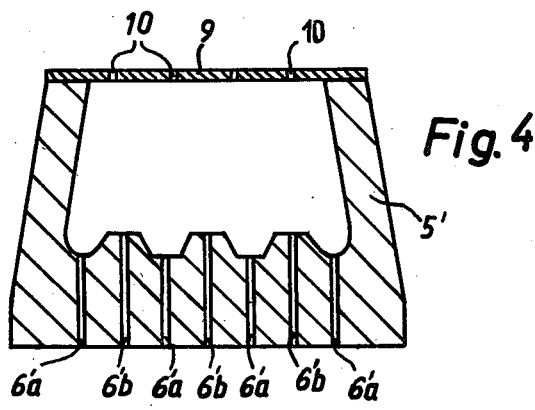
FIG. 4 is a view in cross-section showing a simplified type of apparatus in accordance with the invention.

FIG. 4 illustrates diagrammatically a second embodiment illustrating a simplified apparatus in accordance with the invention, which embodiment differs from that shown in FIGS. 1 to 3 primarily as regards a different formation of the mold wall 3. In FIG. 4, the mold wall has several groove-like depressions running side-by-side along its bottom surface so that the mold box is divided into a corresponding number of mold regions respectively connected by channels or passages 6'a and 6'b to different pressure sources (not shown) in FIG. 4, similar to the arrangement seen in FIGS. 1 to 3.

In the method of using the apparatus of FIG. 4, the pressure difference between the mold chamber regions connected by passages 5a and 5b is maintained only until shortly before the completion of the preshaping operation in the mold. At such point, the pressure in the several passages is equalized so that membrane 9, together with the fabric to be preshaped can come into accurate engagement with the respective depressions in the bottom surface of mold wall 3. Apart from these two differences, however, this apparatus is used in the same manner as the apparatus of FIGS. 1 to 3 and for this reason further detailed description of this modification is unnecessary.

If, departing from the two embodiments shown in FIGS. 1 to 4, no membrane 9 is used, the whole operation may still be carried out as indicated above, since the membrane only serves as an additional means of obtaining uniformity of fabric stretch where the shaping operation involves substantial differences in degree of contour levels or depth. This is especially so where the contour variations are relatively minor. More particularly, the main feature of the invention, i.e. the substantial elimination of friction at the molding surface, is completely independent of whether a membrane is used or not.

The present invention is more particularly adapted to and advantageous for the production of cushions for seats of automobiles, aircraft and other vehicles.

I claim:

1. In apparatus for preshaping a stretchable sheet member to form substantially contour variation in its surface, said sheet member constituting for example a deformable sheet plastic or a fabric rendered impermeable to gas pressure by an elastic plastic coating thereon, said apparatus serving to reduce the amount of non-uniform stretch in localized areas of its surface due to said preshaping which would result from imparting the equivalent amount of contour variation using prior methods of manufacture, said apparatus including a mold box constituting a shaping die, a rigid internal molding surface in said box defining an open-faced die cavity having the ultimately desired contour configuration of said preshaped sheet member, means for temporarily clamping a sheet member across said open face of said die cavity and for sealing said member peripherally thereof, flow passages extending through said molding surface throughout its extent and communicating said die cavity to the back of said molding surface, and means in said mold box for communicating pressure through said flow passages to the underside of the sheet member when clamped across said die cavity, the improvement which comprises means associated with said mold box for interconnecting the flow passages located in the more deeply contoured areas of said mold surface separately from those of the less deeply contoured areas whereby to provide at least two groups of interconnected flow passages; and means for applying different pressures of different levels to the several groups of flow passages whereby to induce gas flow within the die cavity across the undersurface of said sheet member between adjacent areas thereof confronting differently contoured areas of said molding surface.

2. Apparatus as defined in claim 1, wherein said means interconnecting the flow passages of one group separately from those of another group constitute partitions in said mold box which divide said box behind said molding surface into separate compartments, each of the aforesaid means for applying different pressures to the several groups of flow passages being in communication, respectively, with only one of said compartments.

3. Apparatus as defined in claim 2, which further includes a perforated elastic membrane disposed across the open face of said die cavity and peripherally sealed thereto so as to be disposed between a sheet member and said molding surface during shaping of said member, said membrane being characterized in that its face confronting the sheet member is non-sliding relative thereto.

* * * * *

UNITED STATES PATENT OFFICE
CERTIFICATE OF CORRECTION

Patent No. 4,087,224  Dated  May 2, 1978

Inventor(s)  Kurt Moser

It is certified that error appears in the above-identified patent and that said Letters Patent are hereby corrected as shown below:

Column 4, line 47:  Should read:

elastic formed  elastic foamed

Column 6, line 16:  Should read:

passages 5a and 5b  passages 6'a and 6'b

Signed and Sealed this

Thirty-first Day of October 1978

[SEAL]

Attest:

RUTH C. MASON  
Attesting Officer

DONALD W. BANNER  
Commissioner of Patents and Trademarks